United States Patent [19]
Araki et al.

[11] Patent Number: 5,948,842
[45] Date of Patent: Sep. 7, 1999

[54] RUBBER COMPOSITION AND PNEUMATIC TIRE USING THE RUBBER COMPOSITION

[75] Inventors: Shunji Araki; Kazuhiro Yanagisawa, both of Tokyo, Japan

[73] Assignee: Bridgestone Corporation, Tokyo, Japan

[21] Appl. No.: 08/917,234

[22] Filed: Aug. 25, 1997

[30] Foreign Application Priority Data

Aug. 26, 1996 [JP] Japan .................................... 8-223586
Dec. 16, 1996 [JP] Japan .................................... 8-335972

[51] Int. Cl.$^6$ .................................. C08J 5/32; C08K 5/24
[52] U.S. Cl. .......................... 524/261; 524/262; 524/264; 524/265; 524/267; 524/430; 524/495; 525/548; 528/387; 152/209 R
[58] Field of Search ..................... 524/261, 262, 524/264, 265, 267, 430, 495; 528/387; 152/209 R; 525/548

[56] References Cited

U.S. PATENT DOCUMENTS 5,580,919  12/1996  Agostini et al. ........................ 524/430

FOREIGN PATENT DOCUMENTS 5029741    9/1975   Japan .
5120208    6/1976   Japan .
3252431    11/1991  Japan .
7228588    8/1995   Japan .
A10732362  9/1996   Japan .

OTHER PUBLICATIONS

Chem Abstract 128:116176 "Rubber Compositions and Pneumatic Tires Procduced Therefrom Draki et al."

*Primary Examiner*—Duc Truong
*Attorney, Agent, or Firm*—Sughrue, Mion, Zinn, Macpeak & Seas, PLLC

[57] ABSTRACT

The present invention provides a rubber composition comprising natural rubber and/or diene synthetic rubbers, silica in an amount of 10 to 85 parts by weight per 100 parts by weight of the rubber, a specific silane coupling agent, i.e., a bis-(alkoxysilylalkyl) polysulfide having a polysulfide structure in which the distribution of sulfur is specified, in an amount of 1 to 20% by weight of the amount of silica, and provides a pneumatic tire manufactured by using the rubber composition. The pneumatic tire has excellent low heat buildup property, low rolling resistance, and reinforcing property.

16 Claims, No Drawings

RUBBER COMPOSITION AND PNEUMATIC TIRE USING THE RUBBER COMPOSITION

BACKGROUND OF THE INVENTION

1. Field of the Invention

The present invention relates to a rubber composition and a pneumatic tire comprising silica and a silane coupling agent, and more particularly, to a rubber composition and a pneumatic tire in which gelation of a polymer due to a silane coupling agent during mixing at high temperatures of 150° C. or more is suppressed such that the reaction of silica and the silane coupling agent proceeds efficiently without a deterioration in workability.

2. Description of Related Art

Heretofore, carbon black has been used as a reinforcing filler for rubber because carbon black provides higher reinforcement and more excellent abrasion resistance than other fillers. Recently, because of social requirements to save energy and to save resources, particularly to cut down fuel consumption of automobiles, a decrease in the heat buildup of compounded rubbers is also required.

For decreasing the heat buildup of a compounded rubber by using carbon black, use of a small amount of carbon black or use of a carbon black having a large particle size is considered. However, it is well known that, in both methods, decreasing heat buildup is in a contradictory relation with improving reinforcement and abrasion resistance of a rubber composition.

On the other hand, silica is known as a filler which provides decreased heat buildup of a compounded rubber, and applications for many patents, for example, Japanese Patent Application Laid-Open No. Hei-3-252431, have heretofore been made.

However, silica particles tend to cohere together due to hydrogen bonding of silanol groups which are functional groups on the surfaces of the silica particles. For improving the dispersion of silica particles into rubber, the mixing time must be increased. When dispersion of silica particles into rubber is insufficient, a problem arises in that processability in processes such as extrusion and the like deteriorates due to the increase in the Mooney viscosity.

Moreover, the surfaces of the silica particles are acidic. Therefore, there are problems in that basic substances used as vulcanization accelerators are adsorbed such that vulcanization is not carried out sufficiently, and a sufficient modulus of elasticity is not obtained.

In order to solve these problems, various types of silane coupling agents have been developed. For example, use of a silica coupling agent as a reinforcing-material is described in Japanese Patent Application Publication No. Sho-50-29741. However, the use of a silica coupling agent as a reinforcing material is still insufficient for improving fracture properties, workability, and processability of a rubber composition to high standards. Rubber compositions in which a combination of silica and a silane coupling agent is used as a reinforcing material are described in Japanese Patent Application Publication No. Sho-51-20208 and others. However, this method of using a combination of silica and a silane coupling agent as a reinforcing material has a drawback in that flow of the uncured compounded rubber is markedly inferior and workability and processability deteriorate, although reinforcement of the compounded rubber can be remarkably improved and the fracture properties are improved.

The drawbacks of the conventional technologies in which silane coupling agents are used arise due to the following mechanism. When the mixing temperature of rubber is low, the silanol group on the surface of the silica does not react sufficiently with the silane coupling agent, and as a result, the reinforcing effect is not obtained. Dispersion of the silica into the rubber is also inferior, and this causes deterioration of the low heat buildup property which is the strong point of a rubber composition containing silica. Moreover, some of the alcohol formed by the reaction of the silanol group on the surface of the silica and the silane coupling agent does not vaporize completely during mixing because of the low mixing temperature, and the residual alcohol in the rubber vaporizes during an extrusion process so as to form blisters.

On the other hand, when mixing is conducted at high temperatures of 150° C. or more, the silanol group on the surface of the silica and the silane coupling agent sufficiently react with each other, and as a result, the reinforcing property is improved. Because dispersion of the silica into the rubber is also improved, a mixed rubber having a good low heat buildup property is obtained, and the formation of blisters in an extrusion process is suppressed. However, in this temperature range, gelation of the polymer caused by the silane coupling agent takes place simultaneously, and the Mooney viscosity is markedly increased. Thus, processing in later stages becomes impossible in actuality.

Therefore, when a silane coupling agent is used in combination with silica, a multistep mixing must be conducted at a temperature lower than 150° C., and marked decrease in productivity is inevitable.

SUMMARY OF THE INVENTION

The present invention solves the above problems of the conventional art and provides a rubber composition in which gelation of a polymer due to a silane coupling agent during mixing at high temperatures of 150° C. or more is suppressed such that the reaction of silica and the silane coupling agent proceeds efficiently without a deterioration in processability and a pneumatic tire prepared by using the rubber composition.

As the result of extensive studies conducted by the present inventors on rubber compositions comprising silica to solve the above problems, it was found that, when the distribution of bonded sulfur in each component contained in a silane coupling agent is specified, an increase in the Mooney viscosity of a compounded rubber can be suppressed even when the rubber composition is mixed at high temperatures of 150° C. or higher, and a rubber composition having excellent low heat buildup property and processability can be obtained. The present invention was accomplished on the basis of this knowledge.

Accordingly, the present invention provides:

(1) A rubber composition which comprises a rubber component comprising at least one member selected from the group consisting of natural rubber and diene synthetic rubbers; silica in an amount of 10 to 85 parts by weight per 100 parts by weight of the rubber component; in an amount of 1 to 20% by weight of the amount of silica, a silane coupling agent represented by the following general formula:

$$(C_nH_{2n+1}O)_3Si-(CH_2)_m-S_y-(CH_2)_m-Si(C_nH_{2n+1}O)_3$$

wherein n represents an integer of 1 to 3, m represents an integer of 1 to 9, y represents a positive number of 1 or more which has a distribution, and the distribution of $-S_y-$ satisfies the relation:

$$(S_1+S_2+S_3+S_4)/(S_5+S_6+S_7+S_8+S_9) \geq 0.85;$$

(2) A rubber composition as described in (1), wherein the distribution of —$S_y$— satisfies the relation:

$(S_1+S_2+S_3)/$(component(s) S having 4 or more sulfurs)$\geq 0.45$ and the content of component $S_3$ is 20% or more;

(3) A rubber composition as described in (1), wherein the distribution of —$S_y$— satisfies the relation:

$(S_1+S_2+S_3)/$(component(s) S having 4 or more sulfurs)$\geq 0.55$ and the content of component $S_3$ is 30% or more;

(4) A rubber composition as described in any of above (1) to (3) which additionally comprises 80 parts by weight or less by weight of carbon black as a reinforcing filler per 100 parts by weight of the rubber component;

(5). A rubber composition as described in any of (1) to (3), wherein anhydrous sodium sulfide ($Na_2S$) and sulfur (S) are reacted with each other in a mol ratio in a range of 1:1 to 1:2.5 in an atmosphere of an inert gas in a polar solvent to obtain sodium polysulfide, the obtained sodium polysulfide is reacted in an atmosphere of an inert gas with a halogenoalkoxysilane represented by the following general formula:

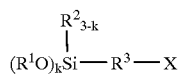

wherein $R^1$ and $R^2$ each represents an alkyl group having 1 to 3 carbon atoms, $R^3$ represents a divalent hydrocarbon group having 1 to 9 carbon atoms, X represents a halogen atom, and k represents an integer of 1 to 3, and the obtained compound is used as the silane coupling agent; and (6) A pneumatic tire which is manufactured by using the rubber composition described in any of (1) to (5) for its tread rubber.

DESCRIPTION OF THE PREFERRED EMBODIMENTS

Embodiments for implementing the present invention are described in detail hereinafter.

As the rubber component in the present invention, natural rubber (NR) and synthetic rubbers can be used singly or as a blend of two or more rubbers. Examples of the synthetic rubber include synthetic polyisoprene rubber, polybutadiene rubber (BR), styrene-butadiene rubber (SBR), butyl rubber, and halogenated butyl rubber.

The silica used in the present invention is a synthetic silica produced by a precipitation process. Specific examples of the silica include NIPSIL AQ manufactured by NIPPON SILICA INDUSTRIAL Co., Ltd.; ULTRASIL VN3 and BV3370GR manufactured by DEGUSSA AG., a German company; RP1165MP, ZEOSIL 165GR, and ZEOSIL 175MP manufactured by RHONE-POULENC Co.; and HISIL233, HISIL210, and HISIL255 manufactured by PPG Co. (all trade names). However, the silica used in the present invention is not limited to these examples.

The amount of silica used is 10 to 85 parts by weight, preferably 20 to 65 parts by weight, per 100 parts by weight of the above rubber component. When the amount of silica used is less than 10 parts by weight, the reinforcing property deteriorates. On the other hand, when the amount of silica used exceeds 85 parts by weight, workability, such as workability in warming up and extrusion, deteriorates. Therefore, such amounts are not preferable. From the standpoint of the low heat buildup property and workability, the amount of silica used is preferably 20 to 65 parts by weight.

The silane coupling agent used in the present invention is a silane coupling agent represented by following general formula:

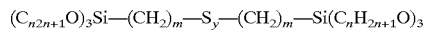

wherein n represents an integer of 1 to 3, m represents an integer of 1 to 9, and y represents a positive number of 1 or more which has a distribution. The distribution of —$S_y$— must satisfy the relation:

$(S_1+S_2+S_3+S_4)/(S_5+S_6+S_7+S_8+S_9) \geq 0.85$, preferably the relation:

$(S_1+S_2+S_3+S_4)/(S_5+S_6+S_7+S_8+S_9) \geq 1.0$.

When this distribution ratio is less than 0.85, the effect of suppressing gelation of a polymer during mixing at high temperatures of 150° C. or higher is not obtained, and the Mooney viscosity is markedly increased to cause inferior processability. It is preferable that the distribution of —$S_y$— satisfies the relation $(S_1+S_2+S_3)/$(component(s) S having 4 or more sulfurs)$\geq 0.45$, and the content of the component $S_3$ is 20% or more. It is more preferable that the distribution of —$S_y$— satisfies the relation $(S_1+S_2+S_3)/$(component(s) S having 4 or more sulfurs)$\geq 0.55$, and the content of the component $S_3$ is 30% or more. When the above ratio is less than 0.45, the effect of suppressing gelation of a polymer during mixing at high temperatures of 150° C. or higher is not sufficiently obtained, and the Mooney viscosity is markedly increased to cause inferior productivity. When the content of the component $S_3$ is 20% or more, the reinforcing property is further enhanced because the contents of components $S_1$ and $S_2$ which do not contribute to the coupling ability are relatively small.

The amount of the silane coupling agent used is 1 to 20% by weight, preferably 3 to 15% by weight, based on the amount of silica. When the amount of the silane coupling agent used is less than 1% by weight, the coupling effect is small. On the other hand, when the amount of the silane coupling agent exceeds 20% by weight, gelation of the polymer takes place. Therefore, such amounts are not preferable.

The process for producing the silane coupling agent used in the present invention is not particularly limited as long as the silane coupling agent having the distribution of bonded sulfur which is specified above can be obtained. For example, the silane coupling agent can be produced in accordance with the following process.

Anhydrous sodium sulfide ($Na_2S$) and sulfur (S) are reacted with each other in a mol ratio in a range of 1:1 to 1:2.5 in an atmosphere of an inert gas in a polar solvent to obtain sodium polysulfide, the obtained sodium polysulfide is reacted in an atmosphere of an inert gas with a halogenoalkoxysilane represented by the following general formula:

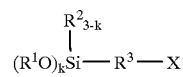

wherein $R^1$ and $R^2$ each represents an alkyl group having 1 to 3 carbon atoms, $R^3$ represents a divalent hydrocarbon group having 1 to 9 carbon atoms, X represents a halogen atom, and k represents an integer of 1 to 3, and the silane coupling agent of the present invention can be obtained.

As the carbon black used as a reinforcing filler in the present invention, a carbon black of the grade SAF, ISAF, or HAF is preferably used. However, the type of carbon black is not particularly limited.

The amount of carbon black used is preferably 80 parts by weight or less per 100 parts by weight of the rubber component. When the amount of carbon black exceeds 80 parts by weight, the low heat buildup property deteriorates to a great extent. From the standpoint of the reinforcing property and the low heat buildup property, the amount is more preferably 25 to 60 parts by weight.

Into the rubber composition of the present invention, compounding ingredients generally used in the rubber industry such as softeners, antioxidants, vulcanizing agents, vulcanization accelerators, and vulcanization accelerator activators, can suitably be mixed as needed in addition to the rubber component, silica, the silane coupling agent, and the carbon black which are described above.

To effectively exhibit the characteristics of the rubber composition of the present invention, the mixing temperature is preferably 150° C. or higher and 180° C. or lower. When the mixing temperature is lower than 150° C., the silane coupling agent does not react sufficiently, and blisters are formed during extrusion. When the temperature exceeds 180° C., gelation of the polymer takes place such that the Mooney viscosity increases. Therefore, such temperatures are not preferable from the standpoint of processing.

The mechanism for preventing gelation of a polymer and improving the low heat buildup property at a mixing temperature of 150° C. or higher is described hereinafter on the basis of the results of studies and considerations of the results.

A silane coupling agent generally used in the tire industry (trade name: Si69, manufactured by DEGUSSA AG., a German company) was heated in an oven at 150° C. for 2 hours and cooled. Thereafter, the treated silane coupling agent was analyzed by high performance liquid chromatography. It was confirmed from the results of the analysis that the components having sulfur chains of —$S_6$— or longer in the molecule were decreased as compared to the original material, and the free sulfur and components having sulfur chains of —$S_4$— or shorter in the molecule were increased as compared to the original material. In other words, it was thought that the components having sulfur chains of —$S_6$— or longer in the molecule were decomposed by the heating at a high temperature. It can be surmised that gelation of a polymer takes place during mixing at a high temperature because radicals are formed during the decomposition of the silane coupling agent or because products formed by the decomposition work as a source of sulfur. Therefore, it was believed that gelation of a polymer is suppressed during mixing at temperatures of 150° C. or higher when the silane coupling agent originally contains smaller amounts of the components having long sulfur chains in the molecule. As the result of intensive studies in accordance with the above idea, it was found that, when the proportion of the components having short sulfur chains in the molecule among the components having sulfur chains of various lengths in the molecule was increased to a specific value or more, gelation of the polymer was actually suppressed. Moreover, dispersion of silica into rubber was improved because the reaction of the silanol group on the surface of the silica and the silane coupling agent took place sufficiently due to mixing at a high temperature, and the low heat buildup property could be obtained.

EXAMPLES

The present invention is described more specifically with reference to the following examples.

The basic formulation used in all of the Examples and Comparative Examples is given in Table 2. Various rubber compositions were prepared in accordance with the formulations given in Tables 3 and 4. The silane coupling agents used in the above formulations are expressed by the following formula:

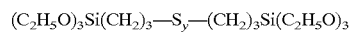

and $S_y$ in this formula has the distribution shown in Table 1. The distributions of various sulfur chain components (—$S_y$—) in the silane coupling agents shown in Table 1 was obtained by calculation from peak areas (%) obtained by the analysis by high performance liquid chromatography (HPLC), which is described in detail in the following.

(Conditions of analysis by HPLC)

HPLC: manufactured by TOSOH CORPORATION, HLC-8020

UV detector: manufactured by TOSOH CORPORATION, UV-8010 (254 nm)

Recorder: manufactured by TOSOH CORPORATION, SUPER SYSTEM CONTROLLER SC-8010

Column: manufactured by TOSOH CORPORATION, TSK GEL ODS-80TM CTR (inner diameter: 4.6 mm, length: 10 cm)

Temperature at the time of measurement: 25° C.

Concentration of sample: 6 mg/10 cc (6 mg per 10 cc of acetonitrile solution)

Amount of injected sample: 20 μl

Condition of elution: flow rate of 1 cc/min

A sample was eluted for 2 minutes with a mixed solution of acetonitrile and water having a fixed composition of 1:1, and then with a mixed solution having a varying composition with such a gradient that the solution contained 100% of acetonitrile after 18 minutes.

When the silane coupling agent of sample A (Si69, manufactured by DEGUSSA AG., a German company) shown in Table 1 was analyzed under the above conditions, peaks of free sulfur, —$S_2$—, —$S_3$—, —$S_4$—, —$S_5$—, —$S_6$—, —$S_7$—, —$S_8$—, and —$S_9$— appeared at positions around peak times of 17.5, 19.5, 20.6, 21.7, 22.8, 24.0, 25.4, 27.1, and 29.0 minutes, respectively. From the measurement of each peak area, the values of $(S_1+S_2+S_3+S_4)$ and $(S_5+S_6+S_7+S_8+S_9)$ were obtained. The value of $(S_1+S_2+S_3+S_4)/(S_5+S_6+S_7+S_8+S_9)$ was calculated from these values and found to be 0.73.

The values of $(S_1+S_2+S_3)$ and $(S_4+S_5+S_6+S_7+S_8+S_9)$ were also obtained. The value of $(S_1+S_2+S_3)/(S_4+S_5+S_6+S_7+S_8+S_9)$ was calculated from these values and found to be 0.225. The peak area of component $S_3$ was 15.9% of the total. These values were obtained for samples B to G as shown in Table 1.

TABLE 1

| | $S_1 + S_2 + S_3 + S_4$ | $S_5 + S_6 + S_7 + S_8 + S_9$ | $(S_1 + S_2 + S_3 + S_4)/(S_5 + S_6 + S_7 + S_8 + S_9)$ | $S_1 + S_2 + S_3$ | component(s) S having 4 or more sulfurs | $(S_1 + S_2 + S_3)/$ (component(s) S having 4 or more sulfurs | $S_3$ |
|---|---|---|---|---|---|---|---|
| sample A*1 | 42.15 | 57.85 | 0.73 | 18.4 | 81.6 | 0.225 | 15.9 |
| sample B*2 | 41.61 | 58.39 | 0.71 | 18.3 | 81.7 | 0.223 | 15.8 |
| sample C*2 | 48.57 | 51.43 | 0.94 | 22.9 | 77.1 | 0.298 | 19.4 |
| sample D*2 | 66.87 | 33.13 | 2.02 | 37.5 | 62.5 | 0.600 | 30.3 |
| sample E*2 | 85.17 | 14.83 | 5.74 | 61.8 | 38.2 | 1.616 | 44.1 |
| sample F*2 | 91.39 | 8.61 | 10.62 | 83.2 | 16.8 | 4.959 | 37.8 |
| sample G*2 | 100 | 0 | ∞ | 100 | 0 | ∞ | 3.2 |

*1SI69, manufactured by DEGUSSA AG., a German company
*2Prepared samples B through G Preparation of samples B to F Samples B to F were synthesized in accordance with the method described in Japanese Patent Application Laid-Open No. Hei-7-228588 from anhydrous sodium sulfide and sulfur in the following mol ratios:

sample B 1:3
sample C 1:2.5
sample D 1:2
sample E 1:1.5
sample F 1:1

Preparation of sample G

Sample G was synthesized in accordance with the method described in European Patent 0 732 362 A1 by oxidation of γ-mercaptopropyltriethoxysilane using manganese dioxide as a catalyst.

The rubber compositions obtained in Examples and Comparative Examples were applied to tread of pneumatic tires of the size 185/60R14, and various tires were prepared.

The obtained rubber compositions were evaluated with respect to Mooney viscosity, the hysteresis loss property (heat buildup), and formation of blisters in accordance with the following methods of evaluation. Rolling resistance of the prepared tires was also evaluated in accordance with the following method of evaluation.

(1) Mooney viscosity

Mooney viscosity was measured in accordance with the method of Japanese Industrial Standard K6300 for a time of 4 minutes at a temperature of 130° C. after preheating for 1 minute. The obtained result is expressed as an index with reference to a control. The smaller the index, the lower the Mooney viscosity and the better the processability.

(2) Measurement of the hysteresis loss property (heat buildup)

The internal loss (tan δ) was measured by using a viscoelastic spectrometer manufactured by IWAMOTO SEISAKUSHO Co., Ltd. under the conditions of a dynamic tensile strain of 1%, a frequency of 50 Hz, and a temperature of 60° C. A slab sheet having a thickness of about 2 mm and a width of 5 mm was used as the test piece. The distance between clamps was 2 cm, and the initial load was 160 g. The obtained value of tan δ is expressed as an index with reference to a control. The smaller the index, the smaller the hysteresis loss and the lower the heat buildup.

(3) Formation of blisters

The formation of blisters was examined by using RHEO-GRAPH 2000 manufactured by GOTTFERT. A die having a thickness of 2 mm and an outlet of a rectangular shape of 9 mm×2 mm was used, and the examination was conducted at 120° C. A sample was extruded at a piston extrusion speed of 10 mm/sec after preheating for 3 minutes, and the formation of blisters on the extruded material was visually examined.

(4) Measurement of rolling resistance

The tire prepared above was attached to a rim 6JJ, inflated to an inner pressure of 2.0 Kg/cm², and, under a load of 440 kg, was made to contact a drum having an outer diameter of 1.7 m, and the drum was rotated. The speed was increased to 120 km/hour, and then the drum was allowed to rotate inertially. The moment of inertia was measured when the speed reached 80 km/hour. Rolling resistance was evaluated from the obtained moment of inertia in accordance with the following equation:

$$\text{index} = [(\text{moment of inertia of control tire})/(\text{moment of inertia of sample tire})] \times 100$$

The calculated value is expressed as an index with the value of control being set to 100. The larger the index, the better the rolling resistance.

(5) Evaluation of the reinforcing property

The tensile strength measured by a tensile test in accordance with the method of Japanese Industrial Standard K6251 using a sample of dumbbell No. 3 at 25° C. is expressed as an index with reference to a control. The larger the index, the larger the tensile strength and the better the reinforcing property.

In the above evaluation of (1), (2), (4) and (5), the rubber composition of Comparative Example 1 was used as the control for Examples 1 to 8 and Comparative Examples 1 to 5, the rubber composition of Comparative Example 6 was used as the control for Example 9 and Comparative Examples 6 and 7, and the rubber composition of Comparative Example 8 was used as the control for Examples 10 and 11 and Comparative Example 8.

TABLE 2

| components of formulation | parts by weight |
|---|---|
| rubber component | 100 |
| silica | varied |
| carbon black | varied |

TABLE 2-continued

| components of formulation | parts by weight |
|---|---|
| aromatic oil | 20 |
| stearic acid | 2 |
| silane coupling agent | varied |
| zinc oxide | 3 |
| antioxidant*[1] | 1 |
| vulcanization accelerator*[2] | 1.5 |
| sulfur | 1.5 |

*[1]N-phenyl-N'-isopropyl-p-phenylenediamine
*[2]N-oxydiethylene-2-benzothiazolsulfenamide

TABLE 3-1

| Example | | | | 1 | 2 | 3 | 4 |
|---|---|---|---|---|---|---|---|
| Comparative Example | 1 | 2 | 3 | | | | |
| Formulation (parts by weight) | | | | | | | |
| BR01*[1] | — | — | — | — | — | — | — |
| SBR1500*[1] | 65 | 65 | 65 | 65 | 65 | 65 | 65 |
| NR | 35 | 35 | 35 | 35 | 35 | 35 | 35 |
| silica (NIPSIL AQ)*[2] | 60 | 60 | 60 | 60 | 60 | 60 | 60 |
| carbon black (SEAST 3H)*[3] | — | — | — | — | — | — | — |
| silane coupling agent | | | | | | | |
| type | A | B | A | C | D | E | F |
| amount | 6.0 | 6.0 | 6.0 | 6.0 | 7.2 | 8.4 | 10.8 |
| measured temperature of mixed rubber (°C.) | 152 | 154 | 140 | 157 | 157 | 159 | 157 |
| Results of evaluation | | | | | | | |
| Mooney viscosity (index) | 100 | 102 | 54 | 71 | 64 | 56 | 52 |
| heat buildup (index) | 100 | 100 | 122 | 98 | 96 | 96 | 98 |
| formation of blisters | none | none | some | none | none | none | none |
| rolling resistance (index) | 100 | 100 | 92 | 102 | 103 | 104 | 102 |
| reinforcing property (index) | 100 | 98 | 104 | 100 | 102 | 97 | 97 |

TABLE 3-2

| Example | | 5 | | 6 | | 7 |
|---|---|---|---|---|---|---|
| Comparative Example | 4 | | 5 | | 6 | |
| Formulation (parts by weight) | | | | | | |
| BR01*[1] | — | — | — | — | — | 20 |
| SBR1500*[1] | 65 | 65 | 65 | 65 | 65 | 45 |
| NR | 35 | 35 | 35 | 35 | 35 | 35 |
| silica (NIPSIL AQ)*[2] | 60 | 60 | 60 | 80 | 90 | 60 |
| carbon black (SIEST 3H)*[3] | — | — | — | — | — | — |
| silane coupling agent | | | | | | |
| type | G | D | D | D | D | D |
| amount | 6.0 | 10.8 | 15.0 | 14.4 | 16.2 | 7.2 |
| measured temperature of mixed rubber (°C.) | 158 | 157 | 155 | 159 | 157 | 155 |
| Results of evaluation | | | | | | |
| Mooney viscosity (index) | 60 | 74 | 122 | 93 | 108 | 80 |
| heat buildup (index) | 99 | 91 | 93 | 99 | 106 | 93 |
| formation of blisters | none | none | none | none | none | none |
| rolling resistance (index) | 100 | 107 | 106 | 102 | 97 | 105 |
| reinforcing property (index) | 85 | 96 | 99 | 108 | 101 | 94 |

*[1]Products of JAPAN SYNTHETIC RUBBER Co., Ltd.
*[2]A product of NIPPON SILICA INDUSTRIAL Co., Ltd.
*[3]A product of TOKAI CARBON Co., Ltd.

TABLE 4

| Example | | | 8 | | 9 | 10 |
|---|---|---|---|---|---|---|
| Comparative Example | 7 | 8 | | 9 | | |
| Formulation (parts by weight) | | | | | | |
| BR01*[1] | — | — | — | — | — | — |
| SBR1500*[1] | — | — | — | — | — | — |
| NR | 100 | 100 | 100 | 100 | 100 | 100 |
| silica (NIPSIL AQ)*[2] | 10 | 10 | 10 | 30 | 30 | 20 |
| carbon black (SIEST 3H)*[3] | 40 | 40 | 40 | 60 | 60 | 70 |
| silane coupling agent | | | | | | |
| type | A | A | D | A | D | D |
| amount | 1.0 | 1.5 | 1.5 | 3.0 | 3.6 | 2.4 |
| measured temperature of mixed rubber (°C.) | 160 | 160 | 159 | 160 | 157 | 157 |
| Results of evaluation | | | | | | |
| Mooney viscosity (index) | 100 | 108 | 92 | 100 | 68 | 73 |
| heat buildup (index) | 100 | 96 | 98 | 100 | 97 | 99 |
| formation of blisters | none | none | none | none | none | none |
| rolling resistance (index) | 100 | 102 | 101 | 100 | 103 | 101 |
| reinforcing property (index) | 100 | 104 | 106 | 100 | 102 | 103 |

*[1]Products of JAPAN SYNTHETIC RUBBER Co., Ltd.
*[2]A product of NIPPON SILICA INDUSTRIAL Co., Ltd.
*[3]A product of TOKAI CARBON Co., Ltd.

Because the rubber composition of the present invention uses a silane coupling agent having a specific distribution of sulfur, formation of blisters during extrusion and gelation of a polymer due to the silane coupling agent are simultaneously suppressed during mixing at high temperatures of 150° C. or higher. The reaction of the silica and the silane coupling agent can be conducted without a decrease in workability, and dispersion of the silica into the rubber is improved. Therefore, the rubber composition is widely used for various types of pneumatic tires having excellent low heat buildup property, low rolling resistance, and reinforcing property.

What is claimed are:

1. A rubber composition which comprises a rubber component comprising
   at least one member selected from the group consisting of natural rubber and diene synthetic rubbers; silica in an amount of 10 to 85 parts by weight per 100 parts by weight of the rubber component; and in an amount of 1 to 20% by weight of the amount of silica, a silane coupling agent represented by the following general formula:

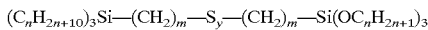

wherein n represents an integer of 1 to 3, m represents an integer of 1 to 9, y represents a positive number of 1 or more having a distribution, the distribution of —$S_y$— satisfying the relation:

$$(S_1+S_2+S_3+S_4)/(S_5+S_6+S_7+S_8+S_9) \geq 0.85$$

and the content of component $S_3$ is 19.4% or more.

2. A rubber composition according to claim 1, wherein the distribution of —$S_y$— satisfies the relation:

$$(S_1+S_2+S_3)/(\text{component(s) S having 4 or more sulfurs}) \geq 0.45$$

and the content of component $S_3$ is 20% or more.

3. A rubber composition according to claim 1, wherein the distribution of —$S_y$— satisfies the relation:

$$(S_1+S_2+S_3)/(\text{component(s) S having 4 or more sulfurs}) \geq 0.55$$

and the content of component $S_3$ is 30% or more.

4. A rubber composition according to claim 1, further comprising 80 parts by weight or less of carbon black as a reinforcing filler per 100 parts by weight of the rubber component.

5. A rubber composition according to claim 2, further comprising 80 parts by weight or less of carbon black as a reinforcing filler per 100 parts by weight of the rubber component.

6. A rubber composition according to claim 3, further comprising 80 parts by weight or less of carbon black as a reinforcing filler per 100 parts by weight of the rubber component.

7. A rubber composition according to claim 1, wherein anhydrous sodium sulfide (Na$_2$S) and sulfur (S) are reacted with each other in a mol ratio in a range of 1:1 to 1:2.5 in an atmosphere of an inert gas in a polar solvent to obtain sodium polysulfide, the obtained sodium polysulfide is reacted in an atmosphere of an inert gas with a halogenoalkoxysilane represented by the following general formula:

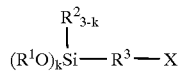

wherein $R^1$ and $R^2$ each represents an alkyl group having 1 to 3 carbon atoms, $R^3$ represents a divalent hydrocarbon group having 1 to 9 carbon atoms, X represents a halogen atom, and k represents an integer of 1 to 3, and the obtained compound is used as the silane coupling agent.

8. A rubber composition according to claim 2, wherein anhydrous sodium sulfide (Na$_2$S) and sulfur (S) are reacted with each other in a mol ratio in a range of 1:1 to 1:2.5 in an atmosphere of an inert gas in a polar solvent to obtain sodium polysulfide, the obtained sodium polysulfide is reacted in an atmosphere of an inert gas with a halogenoalkoxysilane represented by the general formula of claim 7, and the obtained compound is used as the silane coupling agent.

9. A rubber composition according to claim 3, wherein anhydrous sodium sulfide (Na$_2$S) and sulfur (S) are reacted with each other in a mol ratio in a range of 1:1 to 1:2.5 in an atmosphere of an inert gas in a polar solvent to obtain sodium polysulfide, the obtained sodium polysulfide is reacted in an atmosphere of an inert gas with a halogenoalkoxysilane represented by the general formula of claim 7, and the obtained compound is used as the silane coupling agent.

10. A pneumatic tire which is manufactured by using the rubber composition described in claim 1 for tread rubber.

11. A pneumatic tire which is manufactured by using the rubber composition described in claim 2 for tread rubber.

12. A pneumatic tire which is manufactured by using the rubber composition described in claim 3 for tread rubber.

13. A pneumatic tire which is manufactured by using the rubber composition described in claim 4 for tread rubber.

14. A pneumatic tire which is manufactured by using the rubber composition described in claim 5 for tread rubber.

15. A pneumatic tire which is manufactured by using the rubber composition described in claim 6 for tread rubber.

16. A pneumatic tire which is manufactured by using the rubber composition described in claim 7 for tread rubber.

* * * * *

UNITED STATES PATENT AND TRADEMARK OFFICE
CERTIFICATE OF CORRECTION

PATENT NO. : 5,948,842
DATED : September 7, 1999
INVENTOR(S) : Shunji ARAKI, et al It is certified that error appears in the above-identified patent and that said Letters Patent is hereby corrected as shown below:

On the title page,

Foreign Patent Documents

"A10732362    9/1996    Japan"    should read

--A10732362    9/1996    European--.

Signed and Sealed this

Eighteenth Day of July, 2000

Attest:

Attesting Officer

Q. TODD DICKINSON

Director of Patents and Trademarks